Feb. 6, 1940.  W. A. BRECHT  2,189,598
SHAFT COUPLING
Filed Feb. 20, 1937
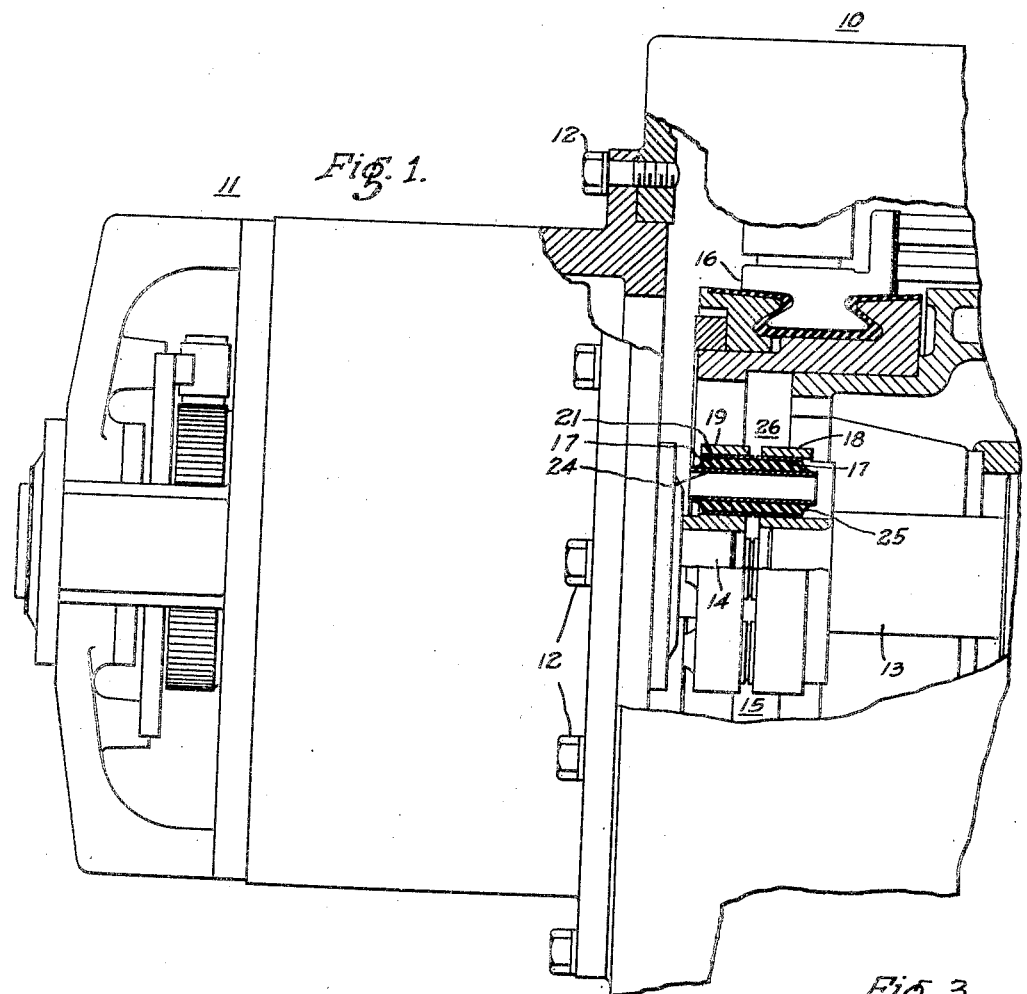
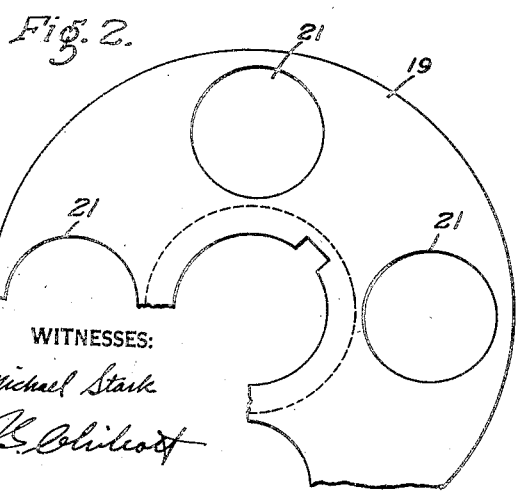
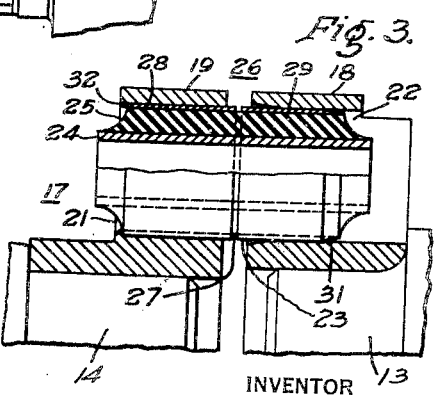
WITNESSES:
Michael Stark
INVENTOR
Winston A. Brecht.
BY
ATTORNEY Patented Feb. 6, 1940

2,189,598

UNITED STATES PATENT OFFICE 2,189,598

SHAFT COUPLING

Winston A. Brecht, Pittsburgh, Pa., assignor to Westinghouse Electric & Manufacturing Company, East Pittsburgh, Pa., a corporation of Pennsylvania Application February 20, 1937, Serial No. 126,845

4 Claims. (Cl. 64—11)

My invention relates to coupling devices and particularly to couplings for connecting the shafts of electrical or other machines.

In order to reduce the overall length of certain machines which are to be installed in a limited amount of space as, for example, the exciter and generator of the power plant of a Diesel-electric locomotive, it is necessary to mount the exciter on one end of the generator and recess the coupling between the shafts of the two machines into the generator, thereby making the coupling inaccessible during assembly of the machines.

An object of my invention is to provide a coupling for connecting the shafts of two machines which may be entirely enclosed within the machines.

Another object of my invention is to provide a shaft coupling which can be assembled in unaccessible places.

A further object of my invention is to provide a resilient shaft coupling which will permit a predetermined amount of misalignment of the connected shafts.

Still another object of my invention is to provide a coupling which has torsional flexibility.

A still further object of my invention is to provide a resilient shaft coupling which is simple in design, reliable in operation, and which may be economically manufactured.

Other objects of my invention will be explained fully hereinafter or will be apparent to those skilled in the art.

In accordance with one embodiment of my invention, the shafts of a generator and an exciter, which is mounted on one end of the generator, are connected by a flexible coupling which comprises a plurality of cylindrical bushings disposed in flanges pressed on the ends of the shafts. Each one of the coupling members comprises an inner cylindrical sleeve and an outer sleeve with a resilient material, such as rubber, disposed between them. The outer sleeve is transversely cut into two sections, one of which is disposed in each flange, thereby affording the desired flexibility and permitting a predetermined amount of misalignment between the two shafts.

For a fuller understanding of the nature and objects of my invention, reference may be had to the following detailed description, taken in conjunction with the accompanying drawing, in which:

Figure 1 is a view, partially in elevation and partially in section, of an exciter and a portion of a generator having their shafts connected by a coupling constructed in accordance with my invention;

Fig. 2 is an enlarged end view of a portion of one of the flange members utilized in the coupling shown in Fig. 1; and Fig. 3 is an enlarged view, partially in elevation and partially in section, of one of the coupling members disposed in the flanges.

Referring to the drawing, and particularly to Fig. 1, a generator 10 is provided with an exciter 11, which is bolted directly onto one end of the generator frame by stud bolts 12 in order to reduce the overall length of the two machines. The generator 10 is provided with a shaft 13, which may be driven by a Diesel engine or other suitable prime mover (not shown), and the exciter 11 is provided with a shaft 14, which is connected to the generator shaft. Since there is a possibility of a small amount of misalignment occurring between the shaft 13 of the generator 10 and the shaft 14 of the exciter 11, it is necessary to provide a flexible coupling 15 for connecting the two shafts.

With a view to keeping the overall length of the machines at a minimum, the coupling 15 is recessed into the commutator 16 of the generator 10, as shown, thereby making the coupling inaccessible when the machines are assembled, since the coupling is entirely enclosed within the machines. Therefore, it is impossible to utilize a coupling of the usual type which must be accessible in order to complete the connection between the shafts of two machines after they are in their operating positions.

In order to overcome this difficulty, I have devised the flexible coupling 15, which may be assembled by merely pushing the exciter 11 in position against the generator 10. The coupling 15 comprises a plurality of flexible bushings 17 disposed to connect flanges 18 and 19, which are pressed on the shafts 13 and 14, respectively.

As shown in Fig. 2, the flange 19 is provided with four equally spaced holes 21 in which the bushings 17 are inserted. The flange 18 is also provided with four holes 22 similar to the holes 21 with the exception that the edge of each hole next to the flange 19 is beveled slightly at 23, as shown in Fig. 3, to permit the bushings 17 to be started easily into the holes 22 during the assembly operations, as will be described more fully hereinafter.

Each one of the flexible bushings 17 comprises an inner cylindrical sleeve 24 surrounded by a sleeve 25 of rubber, or other suitable resilient material, which is preferably vulcanized to the sleeve 24. An outer sleeve 26 surrounds the rubber sleeve 25 which may also be vulcanized to the sleeve 26.

In order to provide the desired flexibility in the coupling, the outer sleeve 26 is transversely cut at 27, thereby dividing the sleeve into two sections 28 and 29 of substantially the same length and diameter. In this manner the section 28 may move relative to the section 29 as a result of the resiliency of the rubber 25, thereby affording torsional flexibility in the coupling 15 and permitting misalignment of the shafts 13 and 14.

While I prefer to cut the sleeve 26 after the complete bushing 17 is formed, it will be understood that the two sections 28 and 29 may be made separately and then placed around the rubber sleeve 25. In order to facilitate the assembly of the coupling, one end of the section 29 is tapered slightly at 31, as shown in Fig. 3. Also the entire section 29 may be reduced to a slightly smaller outside diameter than the section 28 to further facilitate the assembly operations.

The coupling may be assembled by driving one of the bushings 17 into each of the holes 21 in the flange 19 and peening over the edge of each hole, as shown at 32 in Fig. 3, to retain the bushings in the flange. The exciter 11 is then lifted into place and the tapered ends of the bushings 17 pushed into the holes 22 in the flange 18 on the shaft 13, the holes 22 being substantially in alignment with the holes 21. The exciter 11 is then secured in position by means of the stud bolts 12 which are threaded into the generator 10.

It will be seen that the flexibility of the bushings 17 produced by dividing the outer sleeve 26, as described, will permit misalignments of the order encountered with reasonably accurate manufacturing standards. Furthermore, the coupling has torsional flexibility and it may be readily assembled in inaccessible places, as between the two machines illustrated. However, the coupling herein described is not limited in its application to electrical machines, but may be utilized with machines of other types as well as those illustrated.

I do not desire to be restricted to the specific embodiment of my invention herein shown and described, since it is evident that it may be changed and modified without departing from the spirit and scope of my invention as defined in the appended claims.

I claim as my invention:

1. A unitary resilient coupling bushing comprising an integral inner sleeve, and a sectional outer sleeve with an integral sleeve of resilient material disposed between said inner and outer sleeves and secured thereto, said outer sleeve being transversely cut into a plurality of sections.

2. A unitary resilient coupling bushing comprising an integral inner sleeve, and a sectional outer sleeve with an integral sleeve of resilient material disposed between said inner and outer sleeves and secured thereto, said outer sleeve being transversely divided at substantially its mid-point.

3. A unitary resilient coupling bushing comprising a cylindrical member, an integral sleeve of resilient material surrounding said cylindrical member, and a plurality of sleeves of substantially the same inside diameter surrounding the integral sleeve of resilient material and secured thereto.

4. A unitary resilient coupling bushing comprising an integral inner metal member, an integral rubber sleeve surrounding said metal member, and a sectional outer metal sleeve surrounding said rubber sleeve and secured thereto, said outer sleeve being transversely divided into two sections.

WINSTON A. BRECHT.